Feb. 20, 1951 — C. S. ASH — 2,542,455
VEHICLE WHEEL
Filed June 7, 1946 — 3 Sheets-Sheet 2
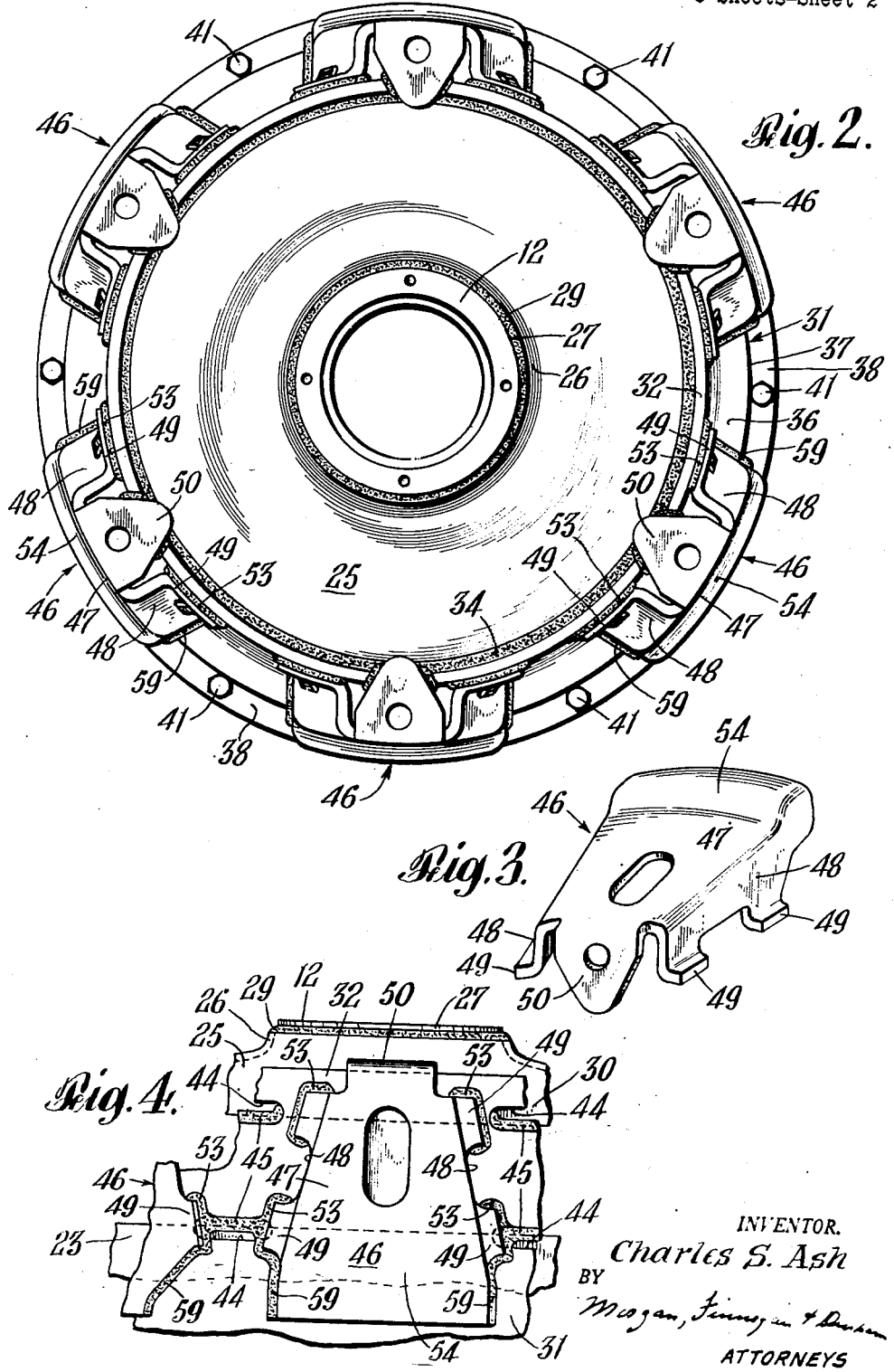
INVENTOR.
Charles S. Ash
BY Morgan, Finnegan & Durham
ATTORNEYS Feb. 20, 1951 C. S. ASH 2,542,455
VEHICLE WHEEL
Filed June 7, 1946 3 Sheets-Sheet 3
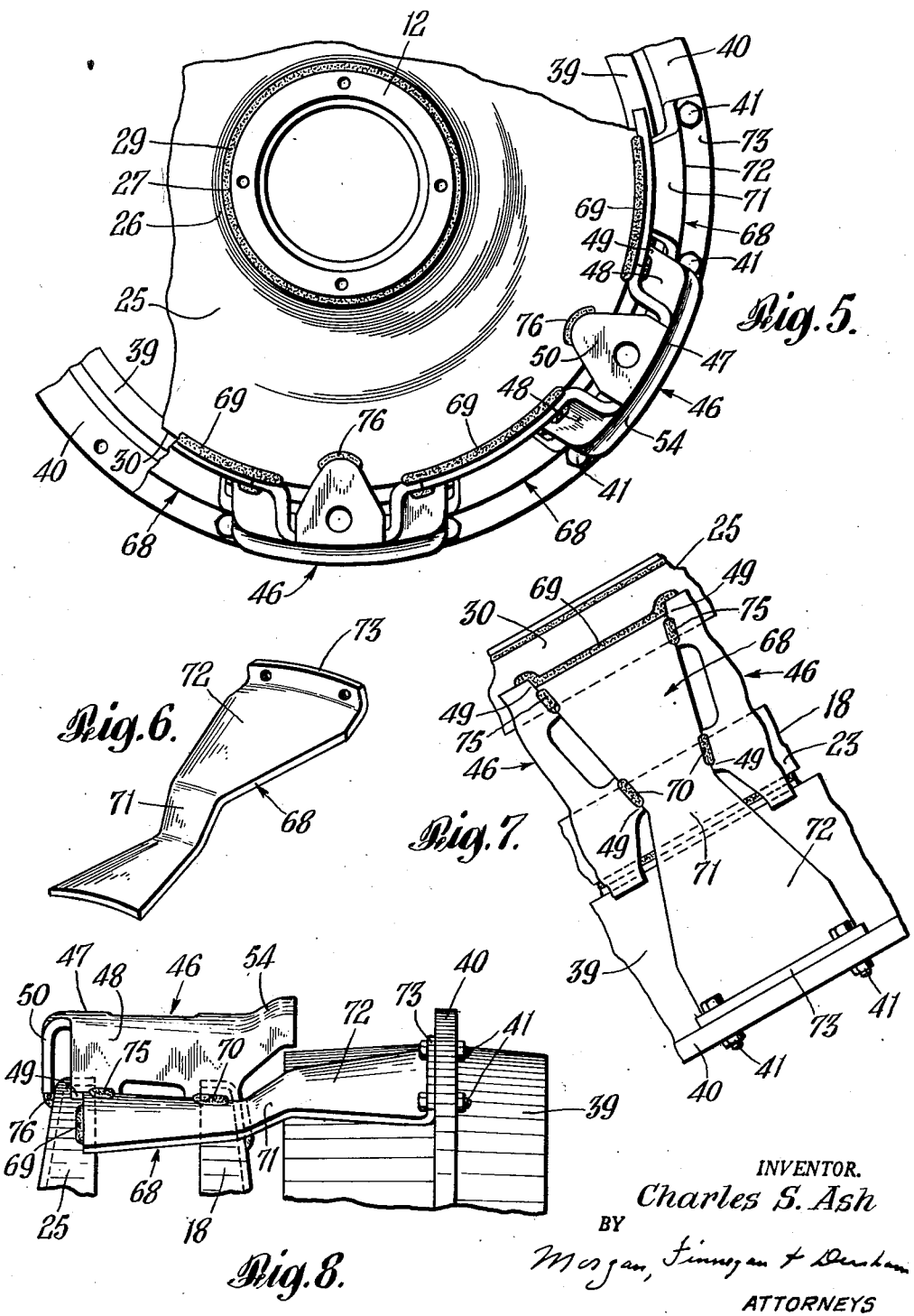
INVENTOR.
Charles S. Ash
BY
Morgan, Finnegan & Durham
ATTORNEYS Patented Feb. 20, 1951

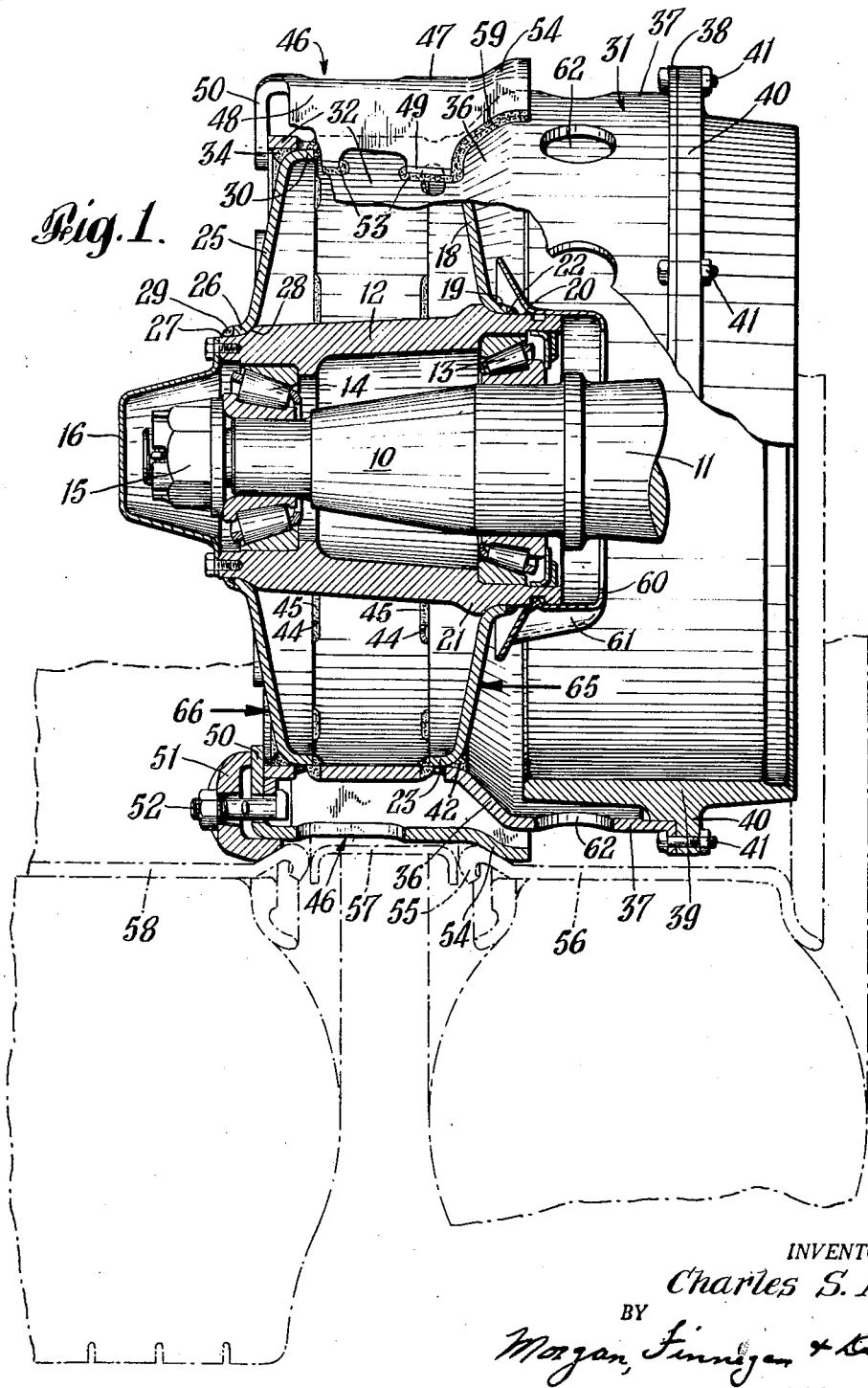

2,542,455

UNITED STATES PATENT OFFICE 2,542,455

VEHICLE WHEEL

Charles S. Ash, Milford, Mich.

Application June 7, 1946, Serial No. 674,976

15 Claims. (Cl. 301—13)

1

The present invention relates to vehicle wheels and more particularly to wheels adapted to demountably support a pair of road engaging members.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 1 is a vertical cross sectional view, certain parts being shown in elevation and broken away, of a typical and illustrative embodiment of the present invention;

Fig. 2 is an end elevational view of the wheel shown in Fig. 1 looking inwardly with the hub cap removed and the wheel shown off of the axle;

Fig. 3 is a perspective view of one of the spoke members mounted on the wheel shown in the first two figures;

Fig. 4 is a fragmentary plan view of the wheel of the first two figures showing a spoke member in place on the wheel;

Fig. 5 is a fragmentary end elevational view looking inwardly of a modified embodiment of the present invention;

Fig. 6 is a perspective view of a tieing and brake drum mounting element used in the embodiment of Fig. 5;

Fig. 7 is a fragmentary plan view showing the element of Fig. 6 in place on the wheel; and Fig. 8 is a fragmentary side elevational view of the wheel shown in Fig. 5 showing the element of Fig. 6 mounted on the wheel together with a spoke member and brake drum.

The present invention has for an object the provision of a light, strong and economical vehicle wheel adapted to demountably mount a pair of pneumatic tire rims. Another object is the provision of a vehicle wheel for mounting dual tires that may be used for heavy duty work such as on trucks, trailers, and busses and is light in construction but adequately strong for the purpose. The invention further provides a dual tired wheel which is economical to fabricate, and certain

2 parts thereof may be made of relatively light gauge material without sacrificing strength in the completed wheel. Still another object is the provision of a vehicle wheel fabricated of a number of separate elements assembled and strongly secured together in a sturdy, light and economical wheel adapted to mount a pair of tire rims.

Referring now in detail to the illustrative embodiments of the invention, shown by way of example in the accompanying drawings, and referring first to the embodiment of Figures 1 to 4 inclusive, the wheel of the present invention is shown as mounted on the reduced end 10 of a trailing type vehicle axle 11. The wheel comprises a tubular hub element 12 mounted on the reduced axle end 10 for free rotation by means of inner and outer anti-friction bearings 13 and 14 respectively. The hub and bearing assembly is maintained in place on the axle end 10 by nut 15, and a hub cap 16 may be secured to the axially outer end of hub 12.

The central body portion of the vehicle wheel, as best shown in Fig. 1, comprises a pair of radially extending web members which are preferably formed of relatively light gauge metal secured to the tubular hub and joined at their outer peripheries by a cylindrical member, the latter member further serving as a mounting for radially and axially extending box-like spokes and a brake drum for the wheel. The axially inner web member 18 is provided at its inner periphery with a short, axially inwardly extending, integral cylindrical portion 19 which is preferably press fitted over a finished peripheral surface 20 of the tubular hub 12. Cylindrical portion 19 is firmly seated against a curved shoulder 21 of hub 12 and the members are securely joined by a circular weld 22. Web 18 is frusto-conically formed throughout its radial extent and the outer periphery thereof is axially outwardly turned to form a short integral cylindrical portion 23.

The outer web member 25 of the wheel is formed similarly to the inner member 18, but oppositely positioned. This web is provided with an outwardly axially turned integral cylindrical portion 26 at its inner periphery press fitted on the finished cylindrical surface 27 adjacent the outer end of hub 12. Cylindrical portion 26 seats against shoulder 28 of the tubular hub and a circular weld 29 joins the hub and web. At its outer periphery web member 25 is formed in an axially inwardly turned cylindrical portion 30, and the web extends frusto-conically between its peripheral cylindrical portions 26 and 30.

The web members 18 and 25 are preferably simply and economically fabricated of flat blanks of metal stamped or drawn into the desired forms.

In order to securely join together the web members 18, 25 at their outer peripheries there is provided an axially extending annular element indicated generally by the numeral 31, having at its axially outer end a cylindrical portion 32 surrounding and seated on the short outer peripheral cylindrical portions 23 and 30 of the web members 18 and 25 respectively. The cylindrical portion 32 extends axially outwardly beyond the outer face of web 25 and a circular weld 34 is provided between the cylindrical portion 32 and the web. Axially inwardly of cylindrical portion 32 member 31 is flared in a frusto-conical portion 36 which terminates in a cylindrical portion 37 of greater diameter than cylindrical portion 32. Portion 37 is provided at its axially inner end with a radial outwardly turned flange 38 to which a brake drum 39 may be secured at its centrally located attaching flange 40 by bolts 41. A strong circular weld 42 is made between web member 18 adjacent its outer periphery and annular member 31 at its frusto-conical surface 36.

At circumferentially spaced intervals about cylindrical portion 32 of tieing element 31 there are provided sets of apertures 44, as best shown in Fig. 4 of the drawings, which are positioned to overlie the ends of cylindrical portions 23 and 30. Welding 45 may be conveniently positioned in these apertures to further strengthen and join the webs 18 and 25 to and through element 31.

Spoke members are provided for demountably supporting a pair of tire rims on the wheel. As best shown in Fig. 3 of the drawings, each spoke member 46 is preferably formed of a single blank of material stamped or drawn into the desired shape. Each spoke member is provided with an axially extending upper surface 47 and radially extending side walls 48 terminating in turned foot portions 49, the latter being seated on the outer surface of cylindrical portion 32. The axially outer end of each spoke is formed with an integral inwardly radially extending wall 50 which seats against the axially outer end of cylindrical portion 32, and provides a plane surface as a seat for rim mounting lugs 51. Each seat 50 is apertured to receive a rim mounting bolt 52 therethrough to cooperate with the lug 51. The spoke members 46 are securely welded to the cylindrical portion 32 by means of welding 53 along the foot portions 49, and are further held by welding 59 between side walls 48 and flared portion 36 of annular member 31.

At its axially inner end the upper surface 47 of each spoke 46 is formed with an inclined seat 54 to receive the turned edge or bead 55 of an inner tire rim 56. A spacing ring 57 is positioned between the inner rim 56 and a duplicate outer rim 58, and cooperates with lugs 51 and inclined seat 54 to securely and demountably mount the rims on the wheel.

An annular grease catcher 60, channelled at 61, may be secured to the inner end of tubular hub 12 in order to direct lubricant escaping from the bearing 13 away from brake drum 39 and associated mechanism. The cylindrical portion 37 of annular member 31 is provided with a plurality of circumferentially spaced apertures 62 through which lubricant thus directed by member 60 may escape.

In fabricating the vehicle wheel just described in the embodiment of the invention shown in Figures 1 to 4 inclusive, the webs 18 and 25 are first assembled in place on tubular hub 12 and welded at 22 and 27. The annular member 31 is then pressed in place with its cylindrical portion 32 surrounding portions 23 and 30 of the webs. Opposing pressures are then preferably exerted upon the web members in directions indicated by the arrows designated 65 and 66 in Fig. 1 of the drawings. The webs are placed under tension by such application of pressure, and annular member 31 is then welded thereto at places 34, 42 and 45. In the wheel thus fabricated the load thereon is carried by the webs under tension rather than under compression as is the case in conventional wheels. The webs may therefore be made of a lighter gauge metal than would otherwise be the case, and weight and expense are saved in fabrication of the wheel without sacrificing strength.

Referring now to the modified embodiment of the invention shown in Figures 5 to 8 inclusive of the drawings, the tubular hub and web structure is identical with the embodiment of the wheel described above. In this embodiment, however, there are provided as brake drum mounting and web tieing means a plurality of axially extending plates 68 of double wedge or hourglass shape, as best shown in Figures 6 and 7 of the drawings.

The axially outer extent of each plate 68 rests upon the cylindrical portions 23 and 30 of the web members and is welded thereto as designated by the numerals 69 and 70 in the drawings. Each plate 68 is turned or inclined at neck portion 71 and thereafter extends axially inwardly in a portion 72 which terminates in a radially outwardly extending flange 73 to which the brake drum 39 is secured by means of the bolts 40. The spoke members 46 are identical to those of the embodiment of the invention shown in Figures 1 to 5 inclusive, and are positioned between adjacent plates 68, the spoke feet 49 abutting the plates and being welded thereto as indicated at 75. The front wall 50 of each spoke member 46 is also welded as indicated at 76 to the axially outer surface of outer web 25.

In this latter embodiment of the invention it will be noted that the plates 68 and spokes 46 form a substantially continuous structure surrounding the inner and outer webs, and a pair of tire rims may be mounted on the spokes 46 in the manner already described for the first embodiment of the invention. The wheel as shown in Figures 5 to 8 inclusive may be assembled in the manner already described for the first embodiment of the invention except that it is desirable to assemble and weld both the plates 68 and the spokes 46 before applying a pressure to bring the webs into a tensioned state.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a hub element, a pair of pressed, frusto-conically shaped web members welded to said element in axially spaced apart relationship, said members being axially spaced apart throughout their radial extent and having axially spaced apart peripheries formed as cylindrical portions, said members being in a tensioned state, and means surrounding the cylindrical portions of said members and welded to each said portion joining said members, said means including pressed, hollow, box-like spoke elements each having a pair of tire rim mounting surfaces.

2. A vehicle wheel comprising, in combination, a hub element, a pair of pressed, frusto-conically shaped web members secured to said element in axially spaced apart relationship, said members having axially spaced apart peripheries formed as cylindrical portions, said members being in a tensioned state, and means surrounding the outer peripheries of said members and secured to each said cylindrical portion joining said members, said means including pressed, hollow, box-like spoke elements each having a pair of tire rim mounting surfaces, and an inwardly axially extending portion for receiving a brake drum.

3. A vehicle wheel comprising, in combination, a hub element, a pair of pressed, frusto-conically shaped web members secured to said element in axially spaced apart relationship, said members having axially spaced apart outer peripheries formed as cylindrical portions, axially extending means secured to each said portion and joining said members together at their outer peripheries said means being formed to receive a brake drum at the axially inner end thereof, and means for mounting a pair of tire rims on said members, said means comprising pressed, hollow, box-like spoke elements.

4. A vehicle wheel comprising, in combination, a hub element, a pair of pressed, frusto-conically shaped web members secured to said element in axially spaced apart relationship, said members having axially spaced apart outer peripheries formed as cylindrical portions, axially extending means secured to each said portion and joining said members together at their outer peripheries, a brake drum secured to said axially extending means, and means for mounting a pair of tire rims on said members, said means comprising pressed, hollow, box-like spoke elements.

5. A vehicle wheel comprising, in combination, a hub element, a pair of web members secured to the hub element in axially spaced apart relationship, said members having axially spaced apart outer peripheries, a cylindrical member surrounding said peripheries and secured to each, and a plurality of radially and axially extending spoke members circumferentially spaced about and secured to the outer surface of said cylindrical member, said spoke members having radially outer surfaces for mounting a pair of tire rims thereon.

6. A vehicle wheel comprising, in combination, a hub element, a pair of web members secured to the hub element in axially spaced apart relationship, said members having axially spaced apart outer peripheries, said web members being in a tensioned state, a cylindrical member surrounding said peripheries and secured to each, and a plurality of radially and axially extending spoke members circumferentially spaced about and secured to the outer surface of said cylindrical member, said spoke members having radially outer surfaces for mounting a pair of tire rims thereon.

7. A vehicle wheel comprising, in combination, a hub element, a pair of frusto-conical web members inclined toward each other secured to the hub element in axially spaced apart relationship, said members having axially spaced apart outer peripheries, said web members being in a tensioned state, a cylindrical member surrounding said peripheries and secured to each, and a plurality of radially and axially extending spoke members circumferentially spaced about and secured to the outer surface of said cylindrical member, said spoke members having radially outer surfaces for mounting a pair of tire rims thereon.

8. A vehicle wheel comprising, in combination, a hub element, a pair of web members secured to the hub element in axially spaced apart relationship, said members having axially spaced apart outer peripheries, a cylindrical member surrounding said peripheries and secured to each, a plurality of radially and axially extending spoke members circumferentially spaced about and secured to the outer surface of said cylindrical member, said spoke members having radially outer surfaces for mounting a pair of tire rims thereon and a brake drum secured to the cylindrical member at the axially inner end thereof.

9. A vehicle wheel comprising, in combination, a hub element, a pair of frusto-conical web members welded to the hub element, said members being entirely axially spaced apart and having integral cylindrical portions at their outer peripheries, a cylindrical member surrounding said cylindrical portions and welded thereto, and a plurality of radially and axially extending spoke members circumferentially spaced about and welded to the outer surface of said cylindrical member, said spoke members having radially outer surfaces for mounting a pair of tire rims thereon.

10. A vehicle wheel comprising, in combination, a hub element, a pair of frusto-conical web members welded to the hub element, said members being entirely axially spaced apart and having integral cylindrical portions at their outer peripheries, a cylindrical member surrounding said cylindrical portions and welded thereto along circular lines between the inner surface of said cylindrical member and the outer surfaces of said cylindrical portions, and a plurality of radially and axially extending spoke members circumferentially spaced about and welded to the outer surface of said cylindrical member, said spoke members having radially outer surfaces for mounting a pair of tire rims thereon, said cylindrical member having apertures between said spokes overlying the ends of said cylindrical portions whereby the cylindrical member may be welded to said cylindrical portions through said apertures.

11. A vehicle wheel comprising, in combination, a hub element, a pair of frusto-conical web members welded to the hub element, said members being entirely axially spaced apart and having integral cylindrical portions at their outer peripheries, a cylindrical member surrounding said cylindrical portions and welded thereto, and a plurality of radially and axially extending spoke members circumferentially spaced about and welded to the outer surface of said cylindrical member, said spoke members having radially outer surfaces for mounting a pair of tire rims thereon, said cylindrical member having a portion extending axially inwardly beyond the inner of said web members and formed to receive a brake drum.

12. A vehicle wheel comprising, in combination, a hub element, a pair of web members secured to the hub element in axially spaced apart relationship, said members having axially spaced apart outer peripheries, a plurality of axially extending plate elements circumferentially spaced about said peripheries, each secured to each of said peripheries and having portions extending axially inwardly beyond the inner of said web members to receive a brake drum, and a plurality of axially and radially extending spoke members, each positioned between a pair of said plate elements and secured to each of said peripheries, said spoke members having outer faces for mounting a pair of tire rims.

13. A vehicle wheel comprising, in combination, a hub element, a pair of web members entirely axially spaced apart secured to said hub element, a plurality of axially extending tieing elements circumferentially spaced apart, each secured to the outer peripheries of said web members, and a radially and axially extending spoke member between each adjacent pair of tieing elements secured to the outer peripheries of said who members, each said spoke members having radially outer surfaces for mounting a pair of tire rims.

14. A vehicle wheel comprising, in combination, a hub el_ment, a pair of web members entirely axially spaced apart secured to said hub element, a plurality of axially extending tieing elements circumferentially spaced apart, each secured to the outer peripheries of said web members, and a radially and axially extending spoke member between each adjacent pair of tieing elements secured to the outer peripheries of said web members, each said spoke members having radially outer surfaces for mounting a pair of tire rims, said web members being in a tensioned state.

15. A vehicle wheel comprising, in combination, a hub element, a pair of web members entirely axially spaced apart secured to said hub element, a plurality of axially extending tieing elements circumferentially spaced apart each secured to the outer peripheries of said web members, a brake drum secured to said tieing members at their axially inner ends, and a radially and axially extending spoke member between each adjacent pair of tieing elements secured to the outer peripheries of said web members, each said spoke member having radially outer surfaces for mounting a pair of tire rims.

CHARLES S. ASH.

REFERENCES CITED

The following references are of record in the file of this patent:

UNITED STATES PATENTS

| Number | Name | Date |
|---|---|---|
| 375,056 | Dunstedter | Dec. 20, 1887 |
| 1,359,964 | Charter | Nov. 23, 1920 |
| 2,033,958 | Sauzedde | Mar. 17, 1936 |

FOREIGN PATENTS

| Number | Country | Date |
|---|---|---|
| 395,286 | France | 1909 |